(12) United States Patent
Fujikawa et al.

(10) Patent No.: US 7,490,973 B2
(45) Date of Patent: Feb. 17, 2009

(54) LIGHTING DEVICE, ELECTRO-OPTICAL DEVICE AND ELECTRONIC APPARATUS

(75) Inventors: Yoichi Fujikawa, Azumino (JP); Osamu Eda, Azumino (JP)

(73) Assignee: Seiko Epson Corporation (JP)

( * ) Notice: Subject to any disclaimer, the term of this patent is extended or adjusted under 35 U.S.C. 154(b) by 208 days.

(21) Appl. No.: 11/348,439

(22) Filed: Feb. 6, 2006

(65) Prior Publication Data

US 2006/0203515 A1    Sep. 14, 2006

(30) Foreign Application Priority Data

Mar. 8, 2005    (JP) .............................. 2005-063479

(51) Int. Cl.
*F21V 7/04* (2006.01)
*G02F 1/1333* (2006.01)

(52) U.S. Cl. .................... 362/634; 362/615; 349/58; 349/60

(58) Field of Classification Search ................. 362/612, 362/614, 615, 560, 561, 606, 613, 621, 628, 362/630–634; 349/58, 60, 65
See application file for complete search history.

(56) References Cited

U.S. PATENT DOCUMENTS

| 3,731,077 A | * | 5/1973 | Reisch ........................ 362/615 |
| 4,729,185 A | * | 3/1988 | Baba ............................ 40/546 |
| 2006/0114689 A1 | * | 6/2006 | Chang et al. ................. 362/561 |

FOREIGN PATENT DOCUMENTS

| JP | 10-039779 | 2/1998 |
| JP | 2000-147544 | 5/2000 |
| JP | 2001-330830 | 11/2001 |
| JP | 2002-100228 | 4/2002 |
| JP | 2004-177876 | 6/2004 |
| JP | 2004-184493 | 7/2004 |
| JP | 2004-258236 | 9/2004 |

* cited by examiner

*Primary Examiner*—John A Ward
(74) *Attorney, Agent, or Firm*—Harness, Dickey & Pierce, P.L.C.

(57) ABSTRACT

A lighting device includes a board mounting a light source, a first hole provided in the board, a projecting part protruded inside the first hole from a periphery of the first hole, a light guide which receives a light emitted from the light source through a light receiving plane, and transmits the light from a light transmitting plane, and the first protrusion which is integrally formed in the light guide and is inserted into the first hole, wherein the projecting part presses a side of the first protrusion so that the board can move toward the light receiving plane.

11 Claims, 12 Drawing Sheets

LIGHTING DEVICE, ELECTRO-OPTICAL DEVICE AND ELECTRONIC APPARATUS

BACKGROUND

1. Technical Field

The present invention relates to a lighting device transmitting a light emitted from a light source to a lighting section by using a light guide. In addition, it relates to an electro-optical device constituted by means of using the lighting device. Besides, it relates to an electronic apparatus constructed by using the electro-optical device.

2. Related Art

Recently, an electro-optical device such as a liquid crystal display device is widely used for electronic apparatuses such as cellular phone, PDA, IC recorder and the like. For example, in order to display a variety of information about an electronic apparatus with an image, the electro-optical device is used. Since this electro-optical device performs the display by controlling a light through the electric control, a lighting device is required as a source of light.

A lighting device used as an electro-optical device generally comprises a light guide formed by a translucent resin and a light source generating the light. LED (Light Emitting Diode), for example, is chiefly utilized for the light source. After the light emitted from LED is introduced into and passes through an internal part of the light guide, it is provided for the display in the electro-optical device as a plane light emitted from a light transmitting plane of the light guide.

LED, a light source, is generally mounted on a board with flexibility, called FPC (Flexible Printed Circuit) board. In addition, LED is provided so that an emitting plane faces with a light receiving plane of a light guide by connecting the FPC board to a frame having the light guide or itself.

As the above-mentioned lighting device, generally, there is provided the lighting device formed by the structure executing the positioning of LED for a light guide by engaging a notch provided in the edge part of the FPC board and a rib provided in a frame of the FPC board. (For example, see JP-A-2004-258236 FIG. 4, Page 5) Furthermore, there is also provided the lighting device with the structure implementing the positioning of LED for the light guide by connecting a pin for the positioning provided in a emitting plane of LED and a gullet for the positioning provided in a light receiving plane of the light guide. (For example, see JP-A-2001-330830 FIG. 2, Page 9)

However, the lighting device disclosed in JP-A-2004-258236 FIG. 4, Page 5, comprising: There is the possibility that LED is dislocated from a predetermined position for a light guide in case the size difference is shown between a notch of a notch provided in the FPC board and a position of a rib provided in a frame. In this case, there is a possibility that the brightness of the lighting device is dispersed. In addition, since the size difference is shown between the position of the notch and the position of the rib provided in the frame, it is the possibility that a gap appears between the light guide and LED. It is the possibility that due to the gap, the brightness of the light introduced into the light guide is lowered. Besides, in the lighting device disclosed in JP-A-2001-330830 FIG. 2, Page 9, there is a possibility that the brightness of the lighting device is dispersed since a special shape is formed on an emitting plane of LED.

SUMMARY

An advantage of some aspects of the invention is to prevent the brightness of a light source from being dispersed by stopping the position of the light source for a light guide from being scattered pertaining to the positioning of a board mounting the light sources like LED et cetera and the light guide.

A lighting device according to an aspect of the invention includes a board mounting a light source, a first hole provided in the board, a projecting part protruded into the inner side of the first hole from a periphery of the first hole, a light guide which receives a light emitted from the light source through a light receiving plane, and transmits the light from a light transmitting plane, and the first protrusion which is integrally formed in the light guide and is inserted into the first hole, wherein the projecting part presses a side of the first protrusion so that the board can move toward the light receiving plane.

A first protrusion integrally formed with a light guide, for example, may be formed directly on the light guide. In addition, the first protrusion may be formed in a member fixing the light guide for the prevention of the shift, such as a case containing the light guide.

In the lighting device, the board mounting the light source moves toward the light receiving plane of the light guide when the projecting part presses the side of the first protrusion. As a result, the light source mounted on the board can approach the light receiving plane of the light guide. In this case, since the light emitted from the light source is difficult to be attenuated between the light source and the light receiving plane, lowering the strength of the light can be prevented. As a result, since the light can be efficiently introduced into the inner part of the light guide, the brightness of the light emitted from the light guide can be raised.

Next, in the lighting device, it is preferable that the light source includes an emitting plane which emits the light and the projecting part presses the side part of the first protrusion so that the emitting plane can be contacted with the light receiving plane. In this case, since a gap is made between the emitting plane and the light receiving plane, lowering the strength of the light can be prevented. As a result, since the light can be efficiently introduced into the inner part of the light guide, the brightness of the light emitted from the light guide can be raised.

Next, in the lighting device, it is preferable that the plurality of first holes are provided in a parallel direction with the light receiving plane. In this case, since the board can be pressed toward the light receiving plane of the light guide, the light source can surely approach the light receiving plane.

Next, in the lighting device, by at least one of the plurality of first holes and one first protrusion, it is preferable to execute the positioning of the light source in a parallel direction with the light receiving plane. In this case, it is possible to determine the position of the light source in a parallel direction with the light receiving plane as well as approach the light receiving plane of the light guiding plane. Accordingly, dispersing the position of the light source is prevented for the light guide can be prevented. As the result, the light of the stable brightness without a disparity can be emitted from the light guide.

Next, in the lighting device, it is preferable that the hole for positioning which is provided in the board and connected with the second protrusion is connected with the second protrusion so that the movement of the board is restrained in a parallel direction with the light receiving plane of the light guide. Like this, in the lighting device having the hole for positioning, the position of the board can be determined in a parallel direction with the light receiving plane of the light guide._

Next, in the lighting device, it is preferable that the first hole is larger than the outside size by the flank size in a parallel direction with the light receiving plane. The flank size is made so that the first protrusion is inserted into the first hole in determining the position of the board with the hole for positioning and the second protrusion in case the position of protrusion and hole is mismatched since the difference occurs between protrusion or hole. In case the first hole is large than the diameter of the protrusion by the flank size, even if the second protrusion surely can be inserted into the positioning hole, and the size difference occurs between the position of the first protrusion and the position of the first hole when the second protrusion is inserted into the hole for positioning.

Next, in the lighting device, it is preferable that the first hole is any one of oval, ellipse and rectangle. When the first hole is provided so that the longest diameter direction of oval and ellipse, or the long axis direction of rectangle is placed in a parallel with the light receiving plane, the diameter of the first hole can be larger than the diameter of the first protrusion by the flank size in this direction. Accordingly, even if the second protrusion surely can enter the positioning hole, and the size difference occurs between the position of the first protrusion and the position of the first hole when the second protrusion is inserted into the hole for positioning.

Next, in the lighting device, it is preferable that the projecting part is formed in the center of the first hole, in a side of the first hole or in both sides of the first hole. Whenever the projecting part is formed in such a position, it is possible to press the first protrusion so that the board moves toward the light receiving plane of the light guide by the protrusion. As the result, the light source can approach the light receiving plane. In this case, since the light emitted from the light source is difficult to be attenuated between the light source and the light receiving plane, lowering the strength of the light can be prevented. As a result, since the light can be efficiently introduced into the inner part of the light guide, the brightness of the light emitted from the light guide can be raised.

Next, the electro-optical device according to another aspect of the invention comprises the board mounting the light source, the first hole provided in the board, the projecting part protruded into the inner side of the first hole from a periphery of the first hole, the light guide which receives a light emitted from the light source through a light receiving plane, and transmits the light from a light transmitting plane, and the first protrusion which is integrally formed in the light guide and is inserted into the first hole, wherein the projecting part presses a side of the first protrusion so that the board can move toward the light receiving plane.

In the electro-optical device, the electro-optical panel is the panel structure which changes the optical output state by controlling the electrical condition. In addition, the electro-optical panel indicates the panel structure including an electro-optical material such as liquid crystal and realizes the display by using the electro-optical property of the electro-optical material. This electro-optical panel, for example, arranges the electro-optical material completed from glass or is formed by means of filling the electro-optical material between a set of boards. The liquid crystal panel is configured as the electro-optical panel by using the liquid crystal as the electro-optical material.

In the electro-optical device, the board mounting the light source according the electro-optical device of the configuration moves toward the light receiving plane of the light guide when the projecting part presses the side of the protrusion. Accordingly, the light source mounted in the board can approach the light receiving plane of the light guide. In this case, since the light emitted from the light source is difficult to be attenuated between the light source and the light receiving plane, lowering the strength of the light can be prevented. As a result, since the light can be efficiently introduced into the inner side of the light guide, the brightness of the light emitted from the light guide can be raised. As the result, since the light of high brightness can be provided to the electro-optical panel, the bright display without the disparity can be implemented.

Next, in the electro-optical device, it is preferable that the board mounting the light source is connected to the electro-optical panel and has a flexibility to bend toward a plane opposite to the light transmitting plane of the light guide. The wiring board is the board for providing the power and signal required for driving the electro-optical panel from the external apparatus and is formed by a plurality of circuit parts or wirings. Since the board for the light source is needed to be established in case that the light source is mounted on the wiring board, the parts can be saved.

Next, the electronic apparatus according to a further aspect of the invention comprises the electro-optical device configured as mentioned above. Since the electro-optical device related to the invention uses the lighting device emitting the light of high brightness without the disparity, the bright display without the unbalance can be implemented. Accordingly, the electronic apparatus related to the invention using the electro-optical device can display information related to the electronic apparatus stably and brightly.

BRIEF DESCRIPTION OF THE DRAWINGS

FIG. 3 is a plan view showing the main part of the FPC board from the arrow B direction of FIG. 2.

FIG. 7 is a plan view showing the main part of the FPC board from the arrow B direction of FIG. 6.

DESCRIPTION OF EXEMPLARY EMBODIMENTS

Figure 1:
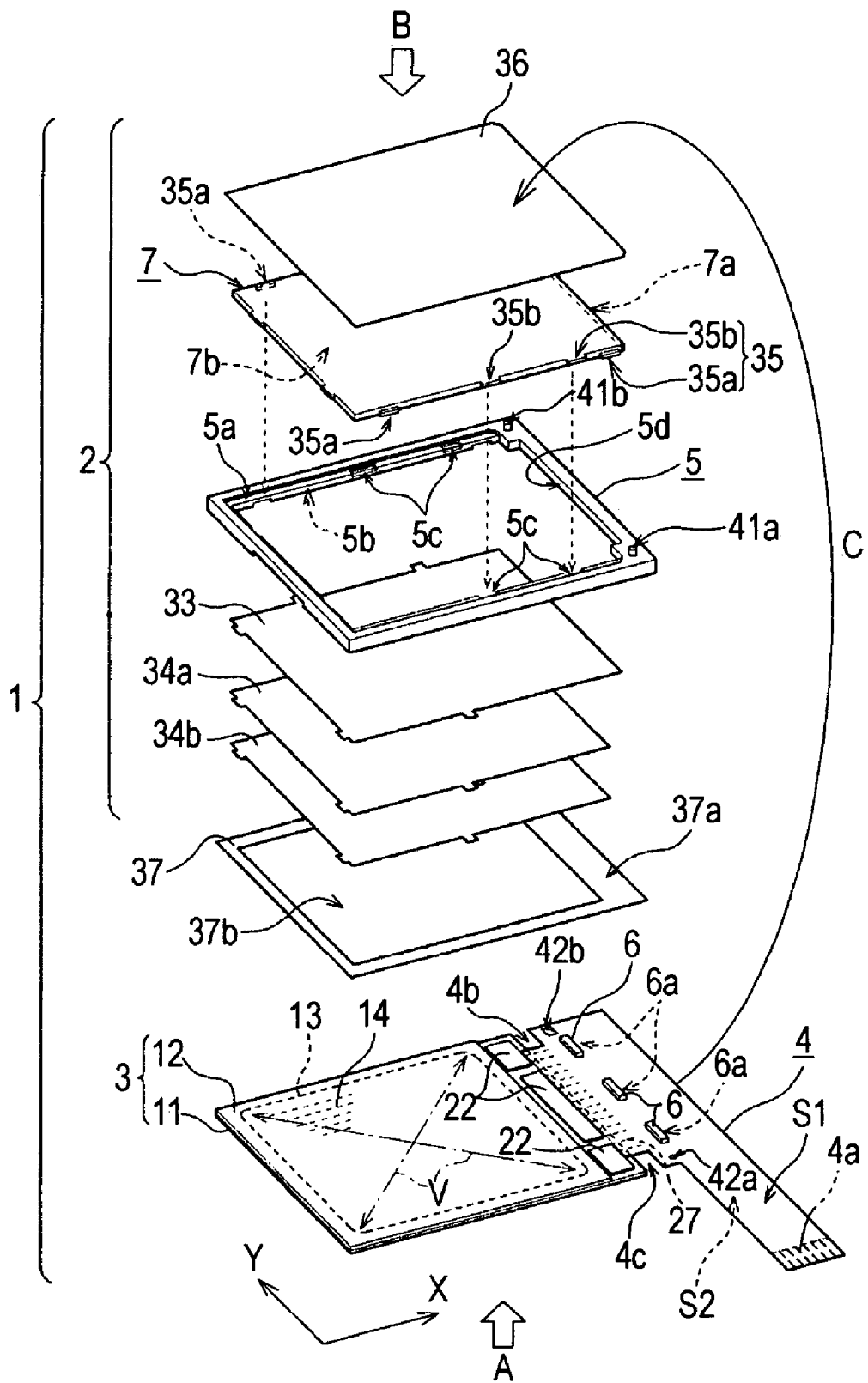
FIG. 1 is an exploded perspective view of an embodiment of the electro-optical device according to the invention.

First Embodiment of Lighting Device and Electro-Optical Device

Hereinafter, the embodiment of the invention will be described with reference to applying the invention to the lighting device used for the electro-optical device. In addition, the embodiment described thereafter is an example, but is not limited to the invention. Besides, in further description, since the drawing is referenced at need, but the drawing indicates the important member in the configuration constituted by the plurality of members with ease, each member is indicated as relative size different from the reality.

Figure 2:
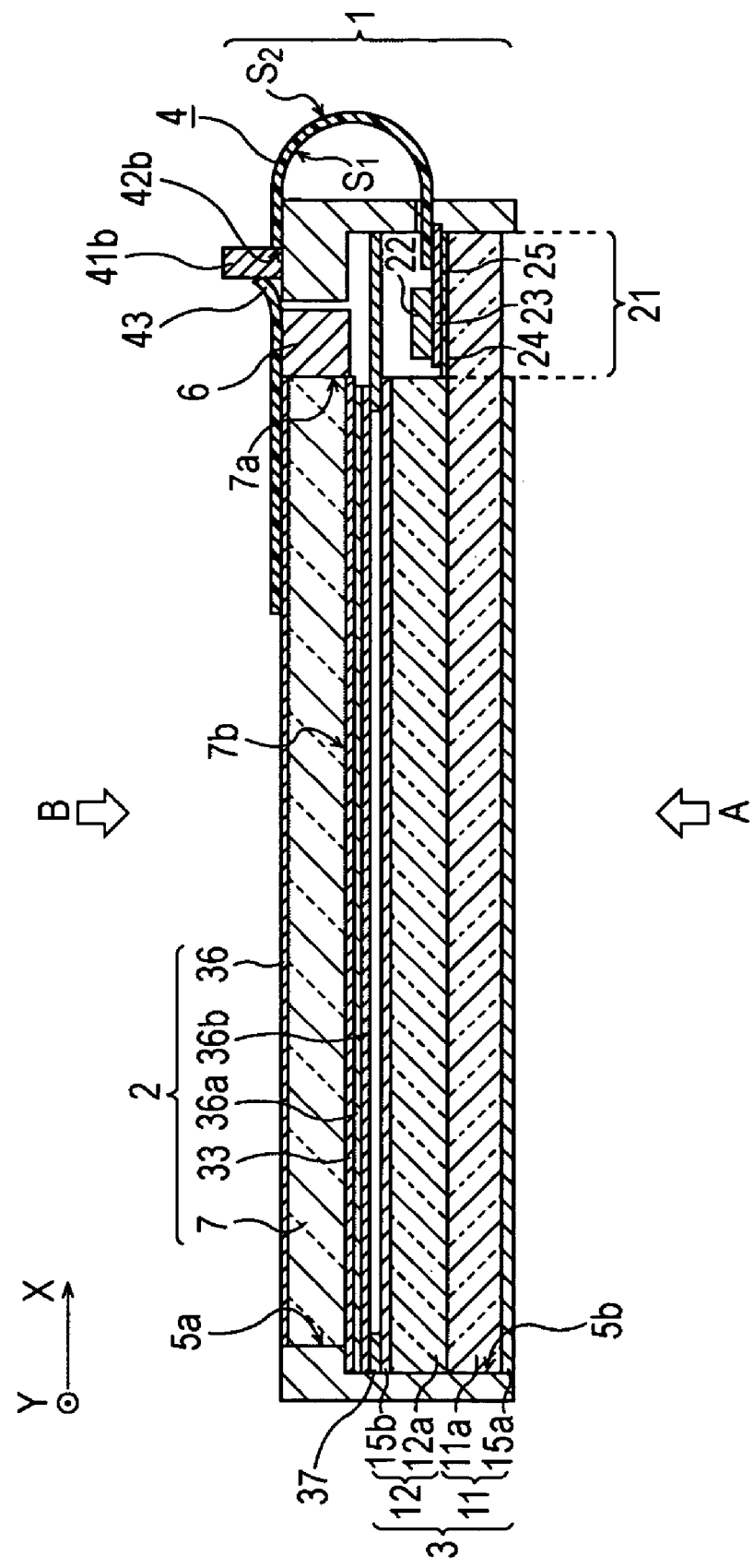
FIG. 2 is a cross-sectional side view of the assembled electro-optical device of FIG. 1.

FIG. 1 illustrates the embodiment of the liquid crystal display device as the lighting device and electro-optical device using the lighting device in the disassembly state. In addition, FIG. 2 shows the cross section structure of the side part in assembling the liquid crystal display device in FIG. 1. The lighting device according to the embodiment, for example, is the lighting device with the configuration used as the edge light-type backlight for the electro-optical device called the liquid crystal display device. Furthermore, the lighting device 2 is the lighting device of the configuration using the plurality of LEDs (Light Emitting Diodes) which are punctate light sources as the light source.

As shown in FIG. 1, the liquid crystal display device 1 includes the liquid crystal panel 3 as the electro-optical panel, FPC (Flexible Printed Circuit) as the wiring board 4, the lighting device 2 and the case 5. In the liquid crystal display device 1, the side marked the arrow A is the observation part.

The liquid crystal panel 3 is formed by joining the first substrate 11 and the second substrate 12 faced with it by using the sealant 13 of the square or rectangle frame shape from the view of the observation direction of the arrow A. When the gap between the first substrate 11 and the second substrate 12, that is, the cell gap is formed, the liquid crystal as the electro-optical material is filled and the liquid crystal layer 14 is constituted.

As shown in FIG. 2, the first substrate 11 has the first translucent substrate 11a of the square or rectangle form from the view of the observation direction indicated by the arrow A. The first translucent substrate 11a, for example, is formed by translucent glass, translucent plastic and the like. The polarizing plate 15a is mounted on the external surface of the first translucent substrate 11a through the adhesion and so on. It is preferable to use other suitable optical components if necessary.

The second substrate 12 opposite to the first substrate 11 has the second translucent substrate 12a of the square or rectangle form from the view of the observation direction indicated by the arrow A. The second translucent substrate 12a, for example, is formed by translucent glass, translucent plastic and the like. The polarizing plate 15b is mounted on the external surface of the second translucent substrate 12a through the adhesion and so on. It is preferable to use other suitable optical components if necessary.

The liquid crystal panel 3 can be configured by optional display mode. For example, in the liquid crystal driving mode, any one of the simple matrix mode and the active matrix mode will be good. In addition, in the type of the liquid crystal mode, TN (Twisted Nematic), STN (Super Twisted Nematic), the vertical orientation mode completed from the liquid crystal with the sub-permittivity and other optional liquid crystal may be utilized. Besides, in the lighting mode, any one of translucent mode, reflection mode and semi-translucent mode will be good. Furthermore, in the embodiment, since the lighting device 2 is established in the side part and its opposite part showing the arrow A of the liquid crystal panel as shown in FIG. 1, the translucent mode or the semi-translucent mode will be good as the lighting.

The simple matrix mode is the matrices mode to which a driving signal is directly applied when each pixel does not have the active element and the intersection part corresponds to pixel or dot. TN and STN are used as the liquid crystal mode for the mode. Next, the active matrix is the matrices mode in which the active elements are provided for each pixel or dot, the power voltage is written when the active element is ON during the reading and the power voltage is preserved and maintained when the active element is OFF in other period. There are provided 3-terminal type and 2-terminal type as the active element used in this mode. TFT (Thin Film Transistor), for example, is included in the active element of 3-terminal type. Besides, TFD (Thin Film Diode), for example, is included in the active element of 2-terminal type.

In case of executing the display of the color in the liquid crystal panel 3, the color filter is provided on the first substrate 11 and the second substrate 12. The color filter selectively transmits the light in the specific wavelength band. Specifically, by corresponding each color of 3 primary colors such as B (blue), G (green) and R (red) to each dot on the first substrate 11 or the second substrate 12, predetermined arrangements such as stripe arrangement, delta arrangement and mosaic arrangement are lined up.

The second translucent substrate 12a constituting the second substrate 12 in FIG. 2 includes the flared portion 21 attached to the external side of the first substrate 11, the opposed board. The driving IC 22 for driving the liquid crystal panel 3, for example, is mounted on the surface of the first substrate 11 part of the flared portion 21 by means of COG (Chip On Glass) using ACF (Anisotropic Conductive Film) 23. As shown in FIGS. 1, 3 driving ICs 22 are mounted in the embodiment. The driving IC 22 drives the liquid crystal panel 3 by outputting the scan signal and data signal to the electrode of the liquid crystal panel 3.

In FIG. 2, on the end side of the second translucent substrate 12a contacted on the flared portion 21 are formed the wiring 24. The wiring 24 of which plural lines open the gap toward the vertical direction from the ground each other is formed. The wiring 24 is connected to the output terminal of the driving IC 22 such as the output bump. In addition, the wiring 24 extends the inside of the liquid crystal panel 3, that is, the liquid crystal layer 14 (See FIG. 1.), so it is connected to the scan electrode and the data electrode in case of the simple matrix mode. Furthermore, the wiring 24 is connected to the active element and electrode such as TFD element or TFT element in the active matrix.

The external connection terminal 25 is formed in the flared portion 21. The external connection terminal 25 of which plural lines open the gap toward the vertical direction from the ground each other is formed. The external connection terminal 25 is connected to the input terminal of the driving IC 22 such as the input bump. In addition, the external connection board 25, for example, is connected to the FPC board 4, the wiring board having the flexibility by ACF 23. The conductive connection techniques such as soldering, heat seal and the like are used for the connection of the FPC board 4 and the external connection terminal 25.

The FPC board 4, for example, is the board with excellent bendability using the film made of polyimide or polyester as material. The FPC board 4 comprises the surface S1 facing the liquid crystal panel 3 and its opposed surface S2 since it can be bended as shown in the arrow C of FIG. 1. The surface S1 can be contracted owing to bendability, while the surface S2 can be extended owing to bendability. In addition, FPC board 4 comprises the input terminal 4a, the bending part 4b and the output terminal 4c. The bending part 4b is the part bended in bending the FPC board 4 like the arrow C. The input terminal 4a is connected to the control circuit, the power source and the like such as cellular phone, personal digital assistant and the like.

In the FPC board 4 are formed a plurality of circuit parts required for driving the liquid crystal panel 3 and a plurality of wirings constituting the circuit through the connection of the plurality of circuit parts. In FIG. 1, the graphic display of the circuit parts and the wirings is omitted. At the position not included in other members when bending the FPC board 4 like the arrow C, for example, the position close to the bending part 4b, the plurality of circuit parts are vertically arranged in parallel to the end side of the liquid crystal panel 3 that is, the end side of the second substrate.

In addition, the bending part 4b is extended and a plurality of wirings 27 which is extended toward the liquid crystal panel 3 is provided on the side surface S2. The wiring 27 is extended toward the direction vertical to the end side of the second substrate 12, that is, the end side of the liquid crystal panel 3. The wiring 27 transmits the output signal of the electronic circuit formed by a plurality of circuit parts to the output terminal 4c. The signal transmitted to the output terminal 4c is transmitted to the driving IC 22 via the external connection terminal 25 of the liquid crystal panel 3.

The lighting device 2 comprises the light guide 7, LED 6 (mounted on the FPC board 4) as the light source and a plurality of optical sheets 33, 34a and 34b. The light guide 7 is placed on the second substrate 12 side of the liquid crystal panel 3. The light guide 7, for example, is formed by translucent resin. Out of the sides of the light guide 7, in a condition that the liquid crystal display device 1 is assembled as displayed in FIG. 2, the later side 7a opposite to the flared portion 21 is the light receiving plane. In addition, the lateral plane on which the arrow A, that is, the plane opposite to the liquid crystal panel 3 is 7b the light transmitting plane.

Furthermore, as shown in FIG. 1, on the sides positioned on both sides of the light receiving plane 7a are provided a plurality of convex portions 35. In the embodiment, four convex portions 35 on one side, that is to say, total eight convex portions on both sides are provided. Four convex portions 35 have two convex portions 35a provided on the light transmitting plane 7b side and two convex portions 35b provided on its opposite side. The convex portion 35a prevents the light guide 7 received in the case 5 from moving toward the indicating direction of the arrow B. On the contrary, the convex portion 35b prohibits the light guide 7 received in the case 5 from moving toward the indicating direction of the arrow A.

LED 6 is shown at the position close to the bending part 4b on the surface S1 of the FPC board 4 and is evenly arranged in parallel to the end side of the first substrate 11, that is, the end side of the liquid crystal panel 3. In addition, the emitting plane 6a of LED 6 faces toward the direction opposite to the end side of the first substrate 11. In the embodiment, three LEDs 6 are provided at a predetermined interval, for example, at even intervals. In a condition that the FPC board 4 is bended toward the direction of arrow C as shown in FIG. 2, three LEDs 6 are arranged so that the emitting plane 6a is opposed to the light receiving plane 7a of the light guide 7.

The light generated from LED 6 is introduced into the inside of the light guide 7 through the light receiving plane 7a, passes through the inside and is emitted from the light transmitting plane 7b as the light on the flat plane. Furthermore, the light source may be constituted by the punctate light source excepting LED 6 or the linear light source called the cold-cathode tube.

In FIG. 1, on the reverse side of the light guide 7 in relation to the direction of the arrow A is provided that light reflecting layer 36 if necessary. Besides, on the observation of the light guide 7, that is, the light transmitting plane 7b is provided a plurality of optical sheets if necessary. In the embodiment, one light diffusion sheet 33 and two prism sheets 34a and 34b are provided as a plurality of optical sheets. Furthermore, it is preferable that the prism sheet is one. If necessary, other optical sheets excepting such optical sheets may be used.

The light diffusion sheet 33 is provided so as to be contacted with the light transmitting plane 7b of the light guide 7, specifically, with the sheet of the light transmitting plane 7b. The light diffusion sheet 33 can diffuse the light emitted from the light transmitting plane 7b. The diffused light is emitted to the outside of the light device 2 as the even light of the sheet spread throughout the light transmitting plane 7b.

The prism sheets 34a and 34b are provided on the light diffusion sheet 33 as shown in FIG. 2. These prism sheets 34a and 34b are the optical components used to focus the incident light toward a specific direction, that is to say, they are formed by arranging a plurality of prism figures in parallel to each other. In the embodiment, as shown in FIG. 1, 2 prism sheets 34a and 34b are successively established. These, for example, are arranged so that the arrangement direction of the prism figures is at right angles to each other. Using these prism sheets 34a and 34b can raise the strength by focusing the light headed toward the liquid crystal panel 3.

When assembling the liquid crystal display device 1 as shown in FIG. 2, the part constituted by the LED 6, light guide 7, light reflecting layer 36, light diffusion sheet 33, and 2 prism sheets 34a and 34b is the lighting device 2. The light is transmitted to the liquid crystal panel 3 by the lighting device 2.

A light blocking sheet 37 formed by the light blocking material is provided between the above-mentioned prism sheets 34a and 34b, and the liquid crystal panel 3. The light blocking sheet 37 has a light blocking portion 37a and an opening portion 37b, as shown in FIG. 1. In the opening portion 37b of the light blocking sheet 37, the light emitted from the light transmitting plane 7b of the light guide 7 passes through and is transmitted to V range, the display of the liquid crystal panel 3. Meanwhile, in the light blocking portion 37a, the light emitted from the light guide 7 is blocked, so that the light emitted from the range except for the display area V of the liquid crystal panel 3 is prevented to come through. In addition, the light blocking sheet 37 has the adherence on both portions. Here, the adherence means the adherent capable of easily scrubbing by hand. The liquid crystal panel 3 is adhered to the case 5 by the light blocking sheet 37.

In FIG. 1, the case 5 comprises the light guide receiving part 5a, the liquid crystal panel receiving part 5b, the light guide latching part 5c and LED receiving part 5d. The case 5, for example, can be formed by resin materials such as plastic, etc. The light guide receiving part 5a is shown in the inside of the case 5, as shown in FIG. 2, is provided on the side in which the arrow B is marked, and accepts the light guide 7. In addition, the liquid crystal panel receiving part 5b is shown in the side of the case 5, is provided on the observation side in which the arrow A is marked, and accepts the liquid crystal panel 3.

As shown in FIG. 1, the light guide latching part 5c is provided on both sides inside the light receiving part 5a. In the embodiment, 8 light guide latching parts 5c are provided. If the convex portion 35a and 35b of the light guide are fitted to the light guide latching part 5c, the light guide 7 is fixed in the case 5.

LED receiving part 5d in which the light guide 7 is contained in the light guide receiving part 5a is provided between the light receiving plane 7a of the light guide 7 and the case 5, and contains LED 6 in a condition of bending the FPC board 4 to the arrow C.

When assembling the liquid crystal display device 1 shown in FIG. 2 by using the liquid crystal panel 3, the driving IC 22, the FPC board 4 and the lighting device 2 shown in FIG. 1, first, mount the driving IC 22 in the flared portion 21 of the liquid crystal panel 3 and install the polarizing plates 15a and 15b in FIG. 2 in the liquid crystal panel 3. Next, connect the FPC board 4 to the part establishing the external terminal 24 in the flared portion 21 of the liquid crystal panel 3. Next, put the lighting device 2 of FIG. 1 into the light guide receiving part 5a of the case 5. At that time, the lighting device 2 in which total eight convex portions 35a and 35b provided in the light guide 7 are inserted into the light guide latching part 5c of the case 5, respectively, is positioned so as not to be dislocated in the case 5.

Next, install the light blocking sheet 37. At that time, the light blocking sheet 37 is provided between the liquid crystal panel receiving part 5b and the end side of the prism sheet 34b, and attaches both parts. And, put the liquid crystal panel 3 into the liquid crystal panel receiving part 5b. The receiving liquid crystal panel 3 is adhered to the case 5 by the light blocking sheet 37. Therefore, the lighting device of the liquid crystal panel 3 the lighting device is positioned at a fixed position within the case 5 by restraining from being positioned in the left-right direction and the direction vertical to the ground as shown in FIG. 2 by the case 5. Next, bend the FPC board 4 like the arrow C of FIG. 1 and in FIG. 2, contact the head of the FPC board 4 to the light reflecting layer 36. Now, the liquid crystal panel 3, the lighting device 2 and the FPC board 4 are received in the case 5 according a predetermined positioning relation, and then, the liquid crystal display device is manufactured.

Figure 3A:
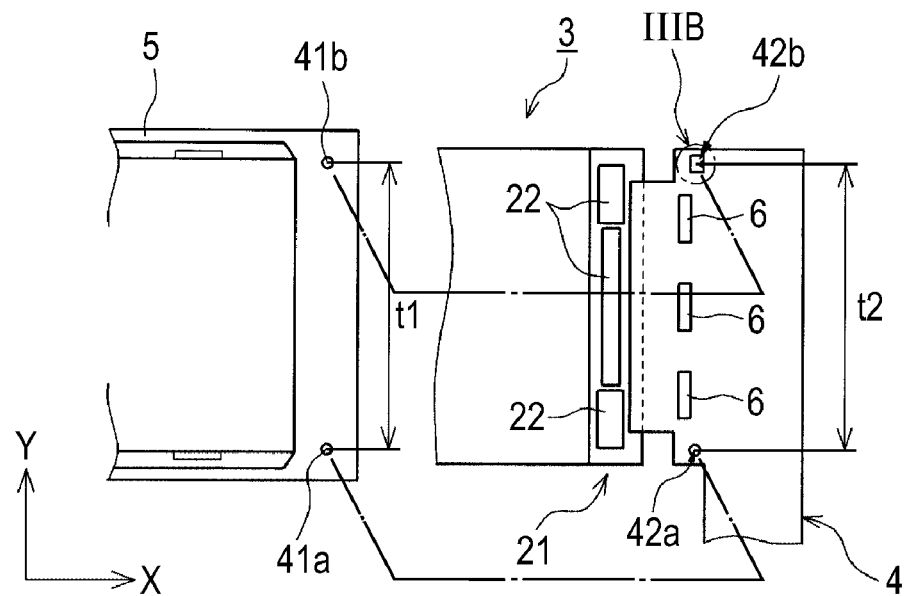
FIG. 3A is a plan view showing the relation of hole and pin.
Figure 3B:
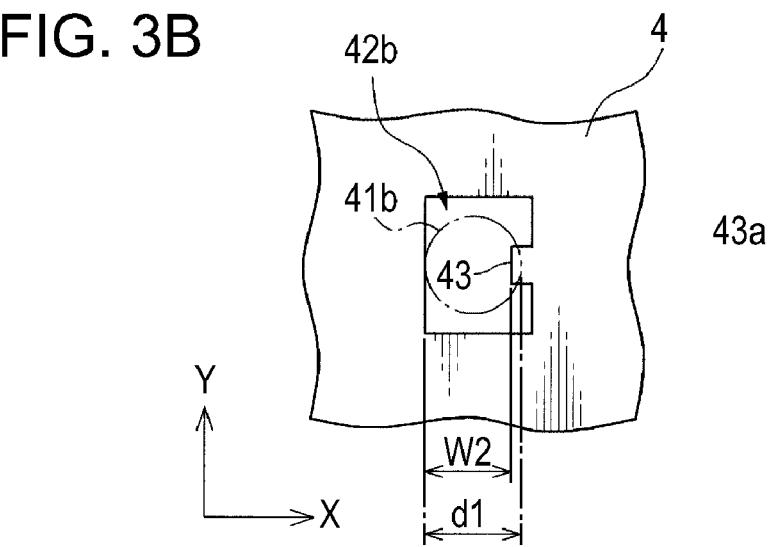
FIG. 3B is an enlarged plan view showing the part indicated by the arrow IIIB of FIG. 3A.

Hereinafter, the lighting device 2 used in the embodiment is described in detail. The FIG. 3A shows the FPC board 4 and the case 5 located around the part connecting the FPC board 4 to the liquid crystal panel 3 in the liquid crystal display device 1 shown in FIG. 1. And, FIG. 3B shows the enlarged part indicated by the symbol IIIB in FIG. 3A.

In FIG. 1, in both angle parts of the case 5 on the side where the light receiving plane 7a is provided the pin 41a as the second protrusion and the pin 41b as the first protrusion. These pins 41a and 41b, for example, are formed in the cylinder figure protruded from the side in which the arrow B of the case 5 is marked. In addition, in the FPC board 4 connected to the liquid crystal panel 3 are provided the hole 42a as the positioning hole and the hole 42b as the first hole. These holes 42a and 42b are provided in the position where the pins 41a and 41b enter into the holes 42a and 42b, respectively, when assembling the liquid crystal display device 1.

In FIG. 3A, the hole 42a in which the pin 41a is inserted is a little larger than the diameter of the pin 41a formed in the cylinder figure, and specifically, the hole 42a is formed so large as the pin 41a cannot be move within the hole over the allowable limit size. The allowable limit size is the size set so as to show the expected capability of the lighting device 2. For example, there can be provided the setting range of LED 6 considered in order to transmit the light emitted from LED 6 to the light guide 7 in the sufficient intensity.

The hole 42a, when the liquid crystal display device 1 is assembled as shown in FIG. 2, is a positioning hole executing the positioning of LED 6 in parallel direction, namely Y-direction, with the light receiving plane 7a of the light guide 7. In FIG. 3A, by using the result that the pin 41a is inserted into the positioning hole 42a, the position of Y-direction of the FPC board 4 can be determined when the liquid crystal display device 1 is assembled. According to this, the LED 6 mounted on the FPC board 4 can determine the Y-directional position for light receiving plane 7a. In addition, in the embodiment, since both the pin 41a and the hole 42a are formed on a circular form, the hole 42a executes the positioning of pin 41a for X-direction and the other whole area of 360° direction without the limitation of Y-direction.

Meanwhile, in the hole 42b, as shown in FIG. 3B, the projecting part 43 protruded inside the hole 42b from a periphery 43a of the hole 42b is provided. The projecting part 43 is formed simultaneously together with the hole 42b by forming the hole 42b on the shape including the projecting part 43 on the FPC board 4. Therefore, the projecting part 43 has flexibility and elasticity as the FPC board 4. Elasticity is a property that an object deformed by an external force returns to the original state when the external force is removed. That is, the projecting part 43 with elasticity has a repulsive power recovering the original state if it can be bent by the external force.

Figure 4A:
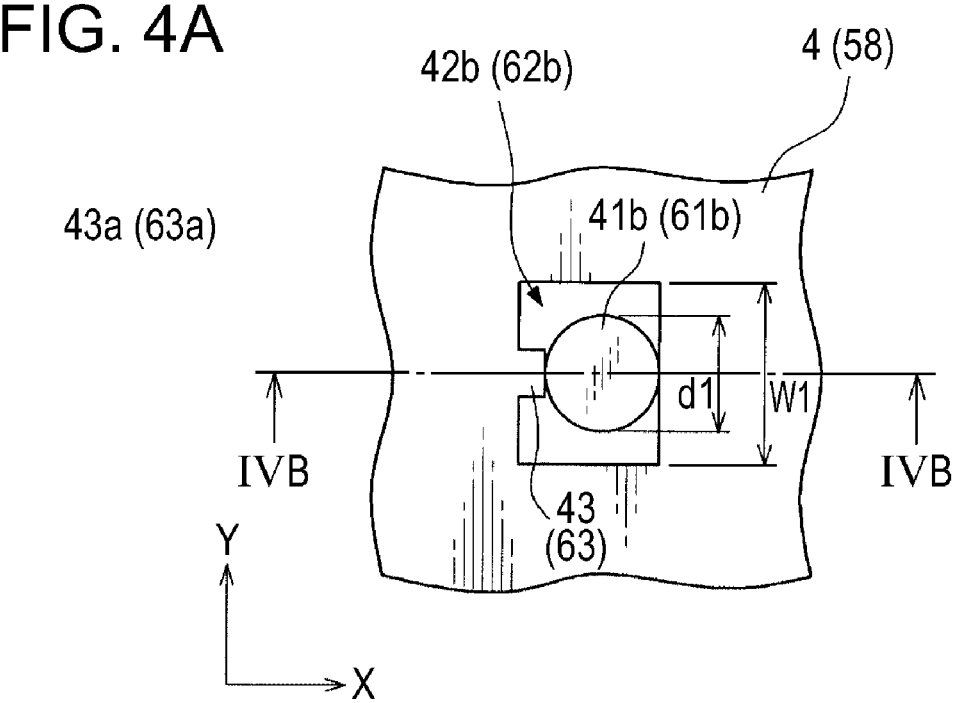
FIG. 4A is a plan view showing the state that the pin is inserted into the hole of FIG. 2.
Figure 4B:
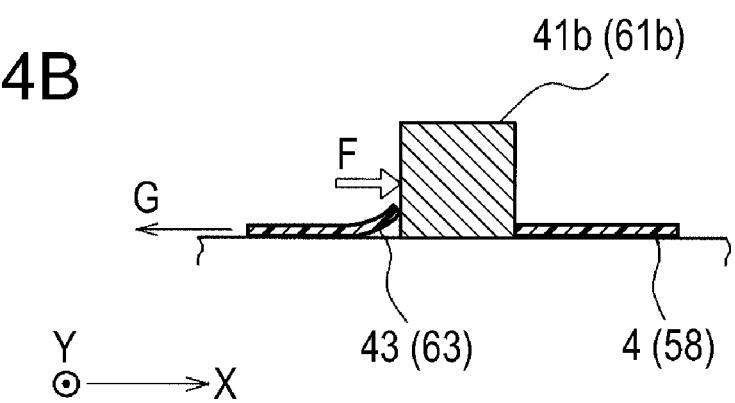
FIG. 4B is a cross-sectional view of FIG. 4A along IVB-IVB line.

FIG. 4 shows the enlarged state that the pin 41b is inserted into the hole 42b in FIG. 2. FIG. 4A is a plan view taken from the arrow B direction of FIG. 2. FIG. 4B is a cross-sectional view of FIG. 4A along IVB-IVB line. In FIG. 4A, the Y-directional width w1 of the hole 42b is sufficiently larger than the diameter d1 of pin 41b, specifically, the distance between the pin 41a and the hole 42a.

First, as described above by using the FIG. 3A, the Y-directional position of LED 6 is determined by using the result that the pin 41a is inserted into the positioning hole 42a. At this time, it is considered that the size difference occurs in the distance t1 between the pin 41a and the pin 41b, and the distance t2 between the positioning hole 42a and the hole 42b, or the disparity occurs in the assembly of members as liquid crystal panel 3 or FPC board 4, etc. As shown in FIG. 4A, if the Y-directional width w1 of the hole 42b is formed sufficiently larger than the diameter d1 of the pin 41b, although the size difference between t1 and t2 or the disparity of the assembly occurs, the pin 41b can be inserted into the hole 42b certainly.

In FIG. 3B, the projecting part 43 is protruded straightly inside the first hole, the width w2 between the front end of the projecting part 43 and the periphery of the hole 42b is formed smaller than the diameter d1 of the pin 41b. In case that the pin 41b is inserted into the hole 42b of this form, that is, in case that the liquid crystal display device 1 is assembled as shown in FIG. 2, the projecting part 43 of FIG. 4B is pressed so as to rotate round the upward direction of paper, that is, Y-direction. At this time, since the pin 41b is applied by force F pressing pin 41b toward X-direction by elasticity of the projecting part 43, the FPC board 4 is pushed toward the direction of arrow G which is the reverse X-direction. That is, in FIG. 2, the FPC board 4 is pushed toward the light receiving plane 7a of the light guide 7 so as to move.

However, it is preferable that the emitting plane 6a of LED 6 is provided in the position close to the light receiving plane 7a of the light guide 7. It is more preferable that the emitting plane 6a is provided so as to be contacted with the light receiving plane 7a, that is, the gap is zero. In this case, since the light emitted from LED 6 is introduced directly into an internal part of the light guide 7 from the light receiving plane 7a, the light can be used efficiently without lowering the brightness of the light. Moreover, in the embodiment, although three LEDs 6 are provided, if all the emitting planes 6a of three LEDs 6 are contacted with the light receiving plane 7a, the light emitted from LED 6 is introduced evenly into the internal part of the light guide 7.

However, the gap occurs between LED 6 and the light guide 7 after it is assembled if the consideration is not made for the FPC board 4 and the light guide 7, since it is necessary to consider the disparity when LED 6 is mounted on the FPC board 4 and the tolerance for assembling in case that the liquid crystal display device 1 is assembled. In this case, there is a possibility that the brightness of the light introduced into the light guide 7 is lowered. For example, in case that the gap of 0.1 mm occurs between the light receiving plane 7a and the emitting plane 6a, the brightness of the light introduced into the light guide is lowered by approximately 10%. Moreover, there is a possibility that the disparity occurs in the brightness of the light introduced into the light guide 7 since the disparity occurs in the position of LED 6 for the light guide 7.

According to the lighting device 2 in the embodiment, as shown in FIG. 2, since the projecting part 43 presses the pin 41b so that FPC board 4 moves toward the light receiving plane 7a of the light guide 7, the LED 6 mounted on the FPC board 4 can approach and contact the light receiving plane 7a of the light guide 7. According to this, the light emitted from LED 6 is efficiently introduced into the internal part of the light guide 7 without lowering brightness. As a result, the brightness of the light emitted from the light guide 7 can be raised. Moreover, since the emitting plane 6a of LED 6 is contacted with the light receiving plane 7a of the light guide 7, it is prevented that the position of LED 6 for the light guide 7 is dispersed. As a result, it is prevented that disparity occurs the brightness of the light introduced into the light guide 7.

The Second Embodiment of the Lighting Device and Electro-Optical Device

Figure 5:
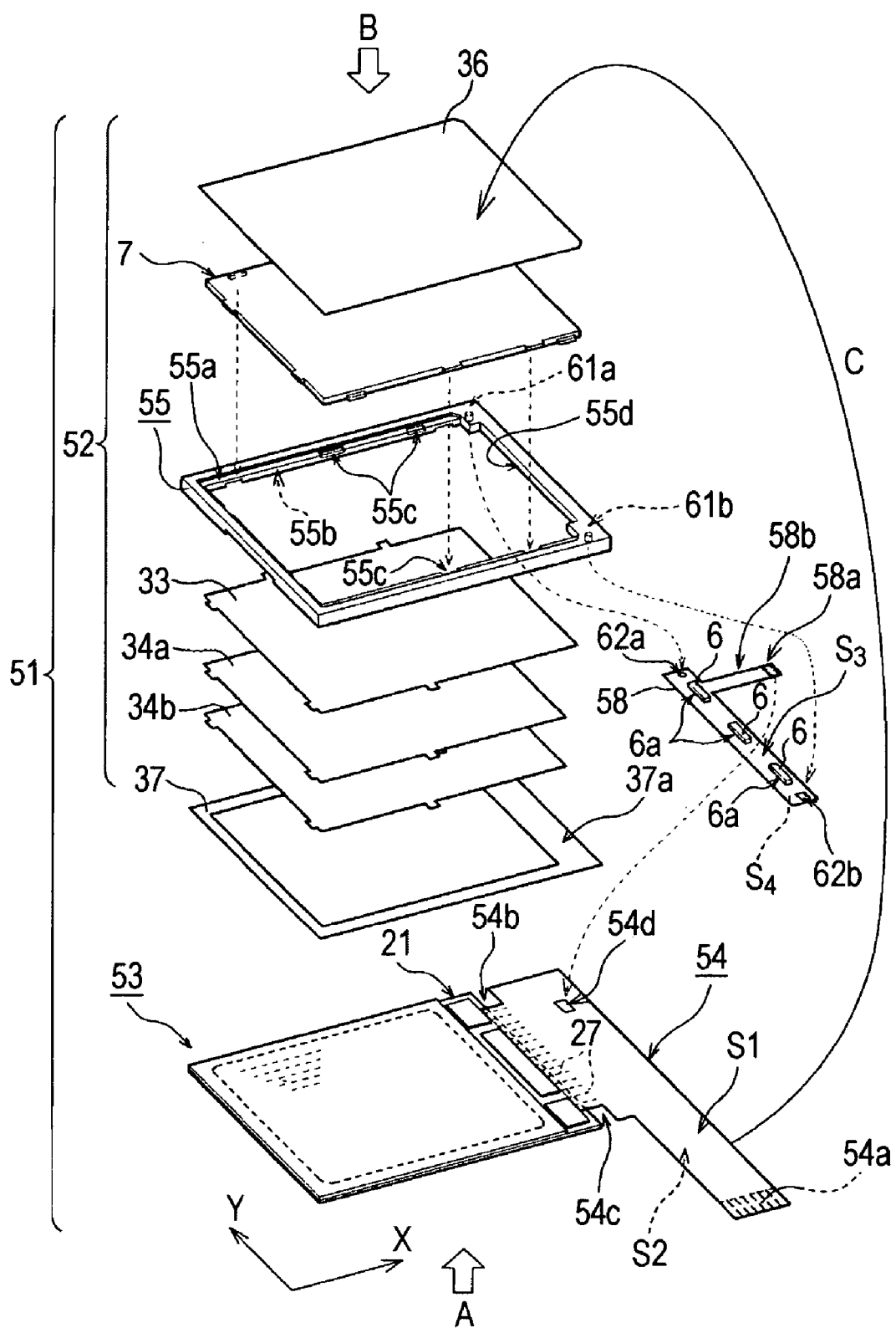
FIG. 5 is an exploded perspective view showing another embodiment of the electro-optical device according to the invention.
Figure 6:
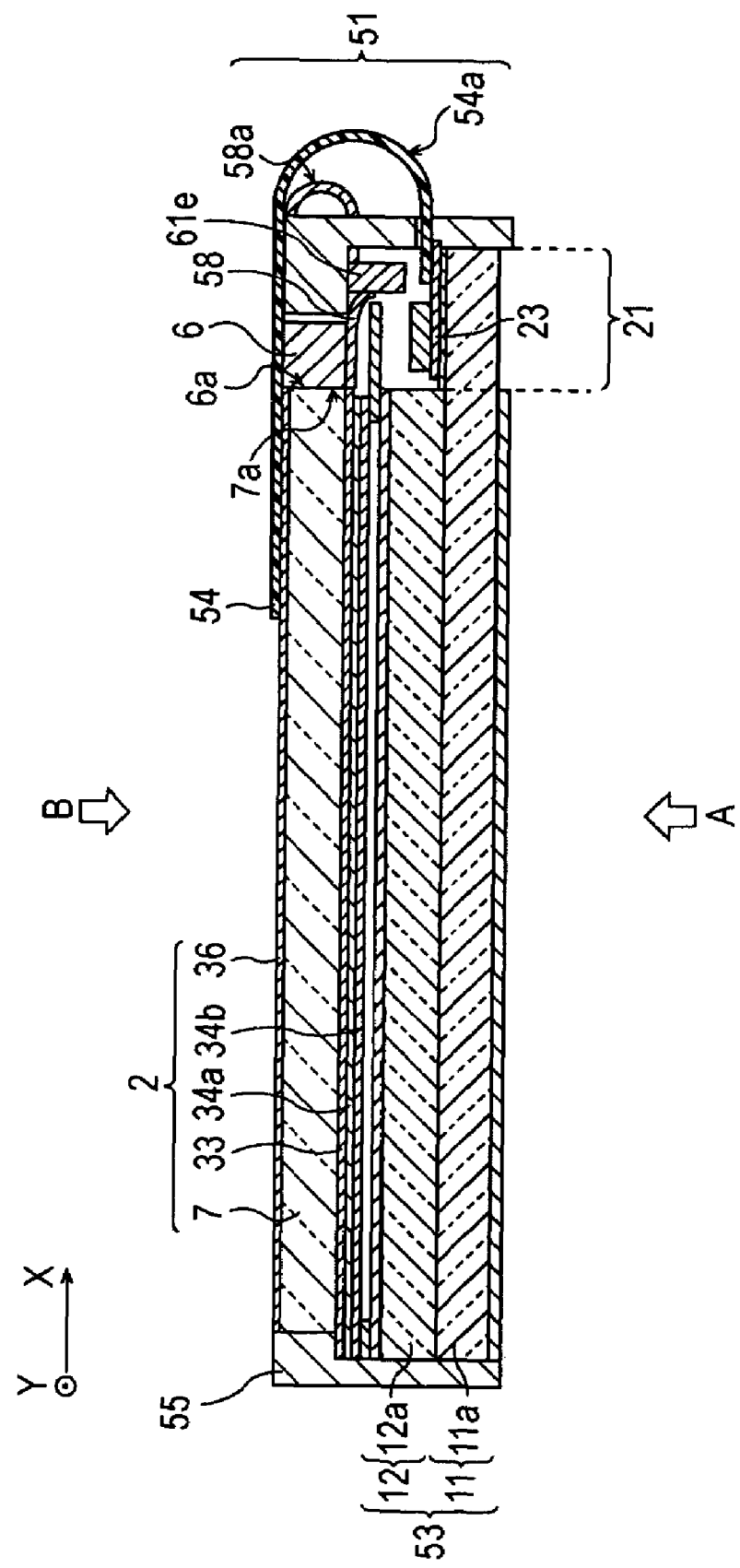
FIG. 6 is a cross-sectional side view showing the disassembled electro-optical device of FIG. 5.

FIG. 5 shows another embodiment according to the lighting device and the electro-optical device of the invention. Moreover, FIG. 6 shows the cross-sectional side structure when the liquid crystal display device of FIG. 5 is assembled. In the liquid crystal display device 1 corresponding to the previous embodiment shown in FIG. 1, there is employed the structure in which the LED 6 as a light source is mounted on the FPC board 4 connected with the liquid crystal panel 3. The liquid crystal display device 51 shown in FIG. 5 employs the structure that provides a LED board 58 in addition to the FPC board 54 connected to the liquid crystal panel 53 and mounts the LED 6 on the LED board 58.

Hereinafter, the liquid crystal display device 51 of FIG. 5 will be described from a different standpoint from the liquid crystal display device 1 of FIG. 1. In addition, the element as same as the embodiment of FIG. 1 is given the same symbol, and the description is omitted. The constitution of the liquid crystal display device 51 shown in FIG. 5 can be same as the liquid crystal display device 1 shown in FIG. 2 except the FPC board 54 and the LED board 58. Moreover, the shape of the case 55 adjacent to the part mounting the LED board 58 is different.

In FIG. 5, the liquid crystal panel 53 can be configured identically as the liquid crystal panel 3 of FIG. 1. In FIG. 6, the FPC board 54 as a wiring board is connected with the end of the flared portion 21 of the liquid crystal panel 53, for example, through ACF 23. The FPC board 54 has the surface S1 bent as the arrow C of FIG. 5 and opposite to the liquid crystal panel 53, and the surface S2 on the opposite side of S1. Moreover, the FPC board 54 has a input terminal 54a, a bending part 54b, a output terminal 54c, a LED terminal 54d. The FPC board 54 can be configured as same as the FPC board of FIG. 1 except for the following points.

First, although the FPC board 4 mounts three LEDS 6 on the surface S1 of the shrunken side, the FPC board 54 of FIG. 5 does not mount the LED 6. Moreover, in the FPC board 4 of FIG. 1, the hole 42a and 42b are provided in the both ends adjacent to the bending part 4b, but in the FPC board 54 of FIG. 5, these holes 42a and 42b are not provided.

Moreover, the LED terminal 54d is provided on the surface S1 of the shrunken side of the FPC board 54. The LED terminal 54d is connected electrically to the input terminal 58a of the LED board 58 described below, for example, with the solder, etc. Moreover, after a connector is provided on the LED terminal 54d and the input terminal 58a of LED board 58 is inserted into the connector, both LED terminals can be connected through the connector.

Next, in FIG. 5, the case 55 has the light guide receiving part 55a, the liquid crystal panel receiving part 55b, the light guide latching part 55c and the LED receiving part 55d, and is formed by using resin such as plastic, etc. Although this case 55 can be the same structure as the case 5 of FIG. 1, it is different in the following points. In the case 5 of FIG. 1, when the light guide 7 is received in the side marked the arrow B, the pin 41a and the pin 41b are provided respectively in both corners where the light receiving plane 7a is located. However, in the case 55 of FIG. 5, when the light guide 7 is centered in the inner side of the liquid crystal panel in the side marked the arrow A, the pin 61a as the second protrusion and the pin 61b as the first protrusion are provided respectively in both corners where the light receiving plane 7a is located. These pin 61a and 61b are formed in the cylinder figure protruded from the side marked the arrow A of the case 55.

Next, the lighting device 52 has the light guide 7, the LED 6 as a light source, the plurality of optical sheets 33, 34 and 34b, and the LED board 58 mounting the LED 6. The lighting device 52 is configured as same as the lighting device 2 of FIG. 1 except the LED board 58.

The LED board 58 shown in FIG. 5 is an excellent bendable board formed with films such as polyimide, polyester, etc. as a base material. The input terminal 58a is provided in the end of the bending part 58b of the LED board 58. As described above, the input terminal 58a is connected with the LED terminal 54d of the FPC board 54. When the liquid crystal display device 51 is assembled as shown in FIG. 6, the bending part 58b of the LED board 58, can be bent in the state that it is connected with the FPC board 54 which can be bent as the arrow C of FIG. 5.

In the embodiment, the plurality of LEDs 6, particularly three are mounted on the surface S3 of the LED board 58. Moreover, the two holes 62a, 62b are provided in the LED board 58. These holes 62a and 62b, when the liquid crystal display device 51 is assembled, are provided in the position where he pin 61a and 62b are inserted into the hole 62a and 62b, respectively.

Figure 7A:
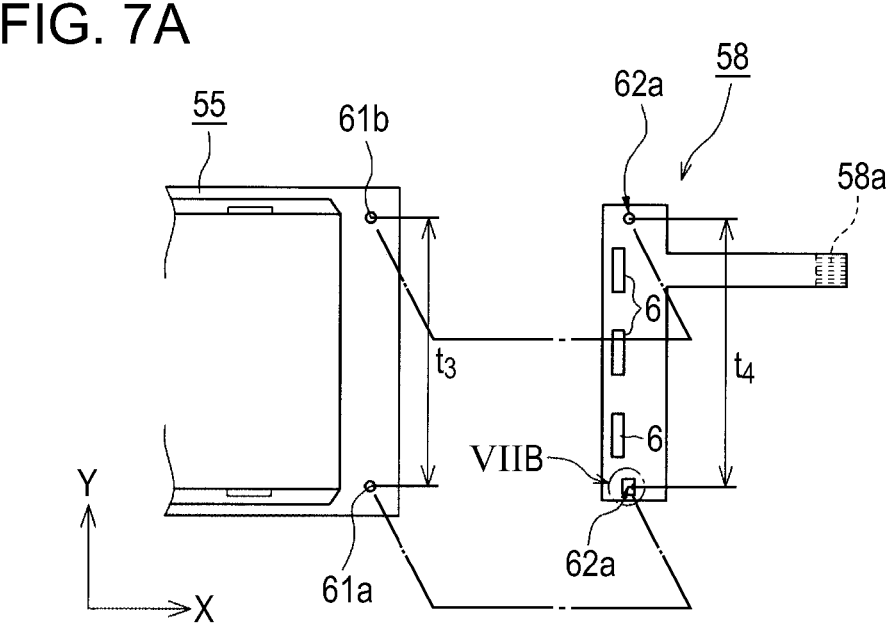
FIG. 7A is a plan view showing the relation of hole and pin.
Figure 7B:
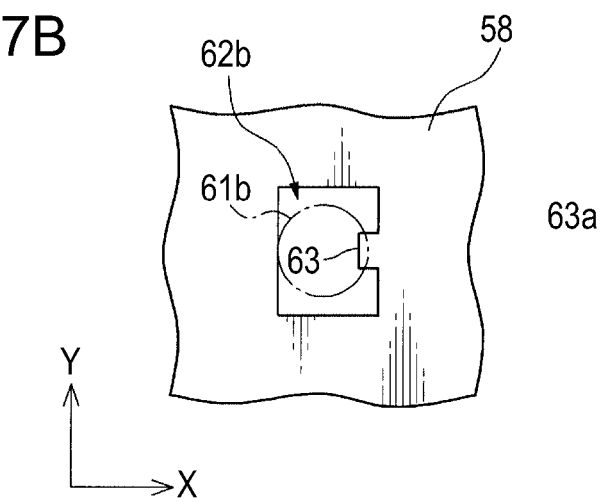
FIG. 7B is an enlarged plan view showing the part indicated by the arrow I of FIG. 7A.

FIG. 7A shows the LED board 58 and the case 55 of the liquid crystal display device 51 shown in FIG. 5 from the side marked the arrow B. Moreover, FIG. 7B shows the enlarged part indicated by the symbol I in FIG. 7A. In FIG. 7A, the hole 62a in which the pin 61a is inserted is slightly larger than the diameter of the pin 61a, specifically, the pin 61a is formed slightly large so as to move in the hole 62a within allowable limit size. The hole 62a, when the liquid crystal display device 51 is assembled as FIG. 6, is a positioning hole executing the positioning of LED 6 in parallel direction, namely Y-direction, with the light receiving plane 7a of the light guide 7. In FIG. 7A, by using the result that the pin 61a is inserted into the positioning hole 62a, the Y-directional position of the LED board 58 can be determined when the liquid crystal display device 51 is assembled. According to this, the LED 6 mounted on the LED board 58 can determine the Y-direction position for the light receiving plane 7a.

Meanwhile, in hole 62b, as shown in FIG. 7B, the projecting part 63 protrudes inside the hole 62b from a periphery 63a of the hole 62b is provided. The projecting part 63 is formed simultaneously together with the hole 62b by forming the hole 62b on the shape including the projecting part 63 on the LED board 58. Therefore, the projecting part 63 has flexibility and elasticity as the LED board 58. The projecting part 63 with elasticity has a repulsive power recovering the original state if it can be bent by the external force.

In FIG. 4A, the Y-directional width w1 of the hole 62b is formed larger than the diameter d1 of the pin 61b. As described above by using the FIG. 7A, the Y-directional position of LED 6 is determined by using the result that the pin 61a is inserted into the positioning hole 62a. At this time, it is considered that the size difference occurs in the distance t1 between the pin 61a and the pin 61b, and the distance t2 between the positioning hole 62a and the hole 62b, or that the disparity occurs in the assembly of the members. As shown in FIG. 4A, if the Y-directional width w1 of the hole 62b is formed sufficiently larger than the diameter d1 of the pin 61b, although the size difference between t3 and t4 or the disparity of the assembly occurs, the pin 61b can be inserted into the hole 62b certainly.

In FIG. 7B, with the projecting part 63 protruding straight inside the hole 62b, the width w2 between the head of the projecting part 63 and the end of the hole 62b is formed to be narrower than the diameter d1 of the pin 61b. When the 61b is inserted into the hole 62b with a shape as above, that is, when the liquid crystal display device 51 is constructed as shown in FIG. 6, the projecting part 63 of FIG. 4B is pressed by the pin 61b and then bends toward the top of the page of FIG. 4, that is, toward the Y direction. Then, since the pin 61b is subject to forces F pushing the pin 61b toward the X direction by the elasticity of the projecting part 63, the LED board 58 is pushed toward the direction of arrow G in the reverse direction to X. That is, in FIG. 6 the LED board 58 is pushed to move toward the light receiving plane 7a of the light guide 7.

According to the lighting device 52 in the embodiment, as shown in FIG. 6, the projecting part 63 presses the pin 61b so that the LED board 58 moves toward the light receiving plane 7a of the light guide 7, and thereby the LED 6 provided on the LED board 58 contacts closely with the light receiving plane 7a of the light guide 7. By this configuration, the light emitted by the LED 6 is effectively introduced inside the light guide 7 without lowering of the brightness. Therefore, the brightness of the light emitted from the light guide 7 can be raised. Furthermore, the light emitting plane 6a of the LED 6 contacts with the light receiving 7a of the light guide 7, and thereby the disparity of the positions of the LED 6 for the light guide 7 can be provided to occur. Therefore, the disparity of the light introduced inside the light guide 7 can be prevented to occur.

Other Embodiments

Although the invention was explained with the preferable embodiments as above, the invention is not limited to the embodiments and may be modified variously within the invention described in the claims.

For example, as shown in FIG. 4A, in the above-referenced embodiments the hole 42b, 62b is larger in the Y direction than the diameter d1 of the pin 41b, 61b and thus has margin thereof in the direction, that is, more specifically, the hole 42b, 62b is formed to be a rectangle whose distance to the pin 41b, 61b is sufficiently larger than the distance between the pin 41a, 61a and the hole 42a, 62a. In addition, the projecting part 43, 63 is formed to extend toward the X direction approximately in the middle of the long side extending toward the Y direction of the hole 42b, 62b. However, the shape of the hole 42b, 62b and the projecting part 43, 63 is not limited to the above-referenced shapes.

Figure 8A:
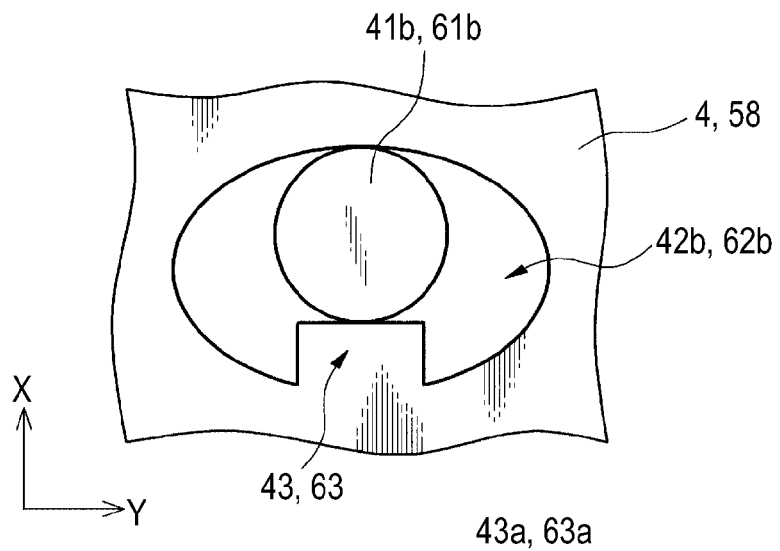
FIG. 8 is a view showing another embodiment of the shape of hole and projecting part.

For example, as shown in FIG. 8A, the shape of the hole 42b, 62b may have an elliptical shape. In this case, the hole 42b, 62b is formed to have its long axis extending toward the Y direction, that is, the parallel direction to the light receiving plane 7a in FIG. 1 or FIG. 5. Furthermore, as shown in FIG. 8A, the projecting part 43, 63 is formed to extend toward the center of the ellipse from the periphery 43a, 63a of the ellipse toward the X direction, that is, toward the short axis direction.

Figure 8B:
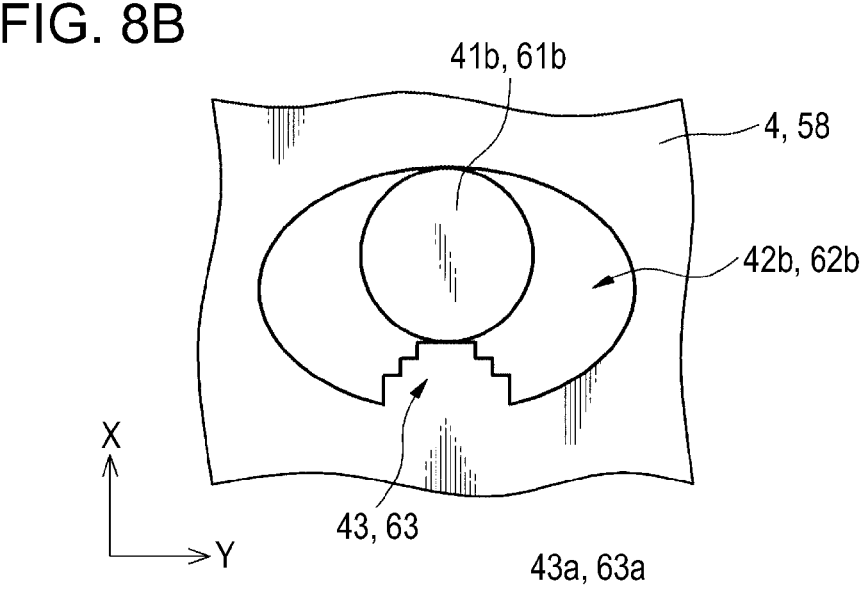

In FIG. 8B, the projecting part 43, 63 is formed so that the width of the projecting part 43, 63 gets smaller in steps toward the X direction in the same elliptical hole 42b, 62b as FIG. 8A. By making the width of the projecting part 43, 63 vary in steps as above, the forces F (cf. FIG. 4B) with which the projecting part 43, 63 presses the pin 41b, 61b can be adjusted. The hole in case that the projecting part is formed in steps is not limited to elliptical shapes and others.

Figure 9A:
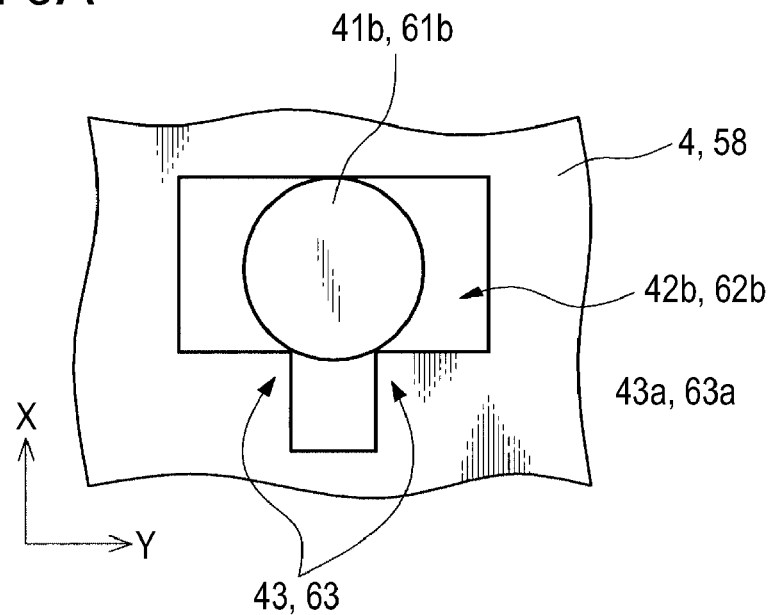
FIG. 9 is a view showing a further embodiment of the shape of hole and projecting part.
Figure 9B:
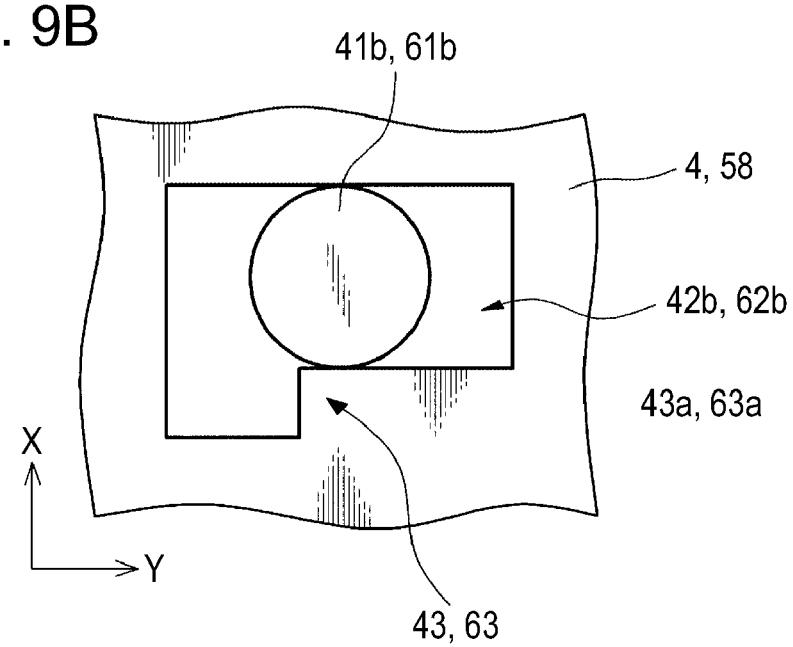

In FIG. 9C, the projecting part 43, 63 is formed on both the edges distant from the center of the long side of the same rectangular hole 42b, 62b as FIG. 4B, and the pin 41b, 61b is pressed by the projecting part 43, 63 on both the edges. In FIG. 9D, the projecting part 43, 63 is formed on one side distant from the center of the long side of the same rectangular hole 42b, 62b.

Moreover, in the above-referenced embodiments, as shown in FIG. 4B, the pin 41a, 41b, 61a, 61b is formed to be in a cylinder shape protruding through the case 5, 55. However, the shape of the pin 41a, 41b, 61a, 61b is not limited to the above. For example, in case of columnar protrusions, the cross-sectional shape is at one's discretion and may be round, elliptical, rectangular, square, and so on, for instance.

Figure 10A:
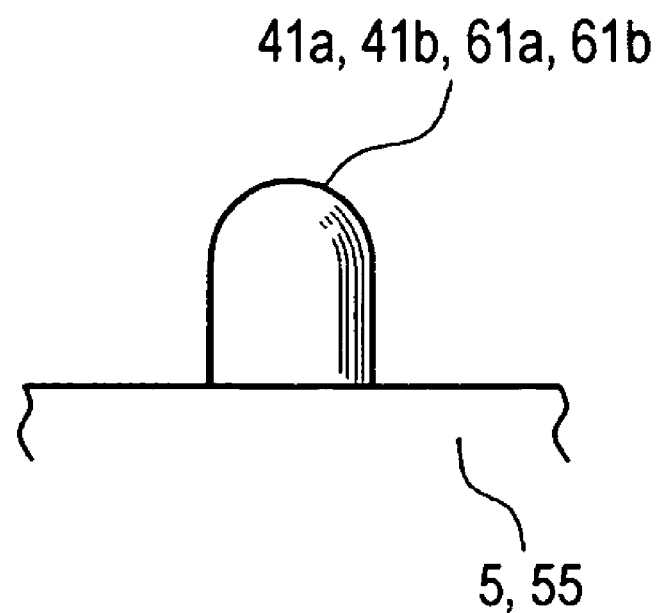
FIG. 10 is a view showing another embodiment of the shape of pin.

Furthermore, as shown in FIG. 10A, the head of columnar pin 41a, 41b, 61a, 61b may be formed to be round. In that case, the pin 41a, 41b, 61a, 61b can easily protrude into the positioning hole 41a, 61a and the hole 41b, 61b, making easy the assembling of the liquid crystal display device 1 in FIG. 1 and the liquid crystal display device 51 in FIG. 5.

Figure 10B:
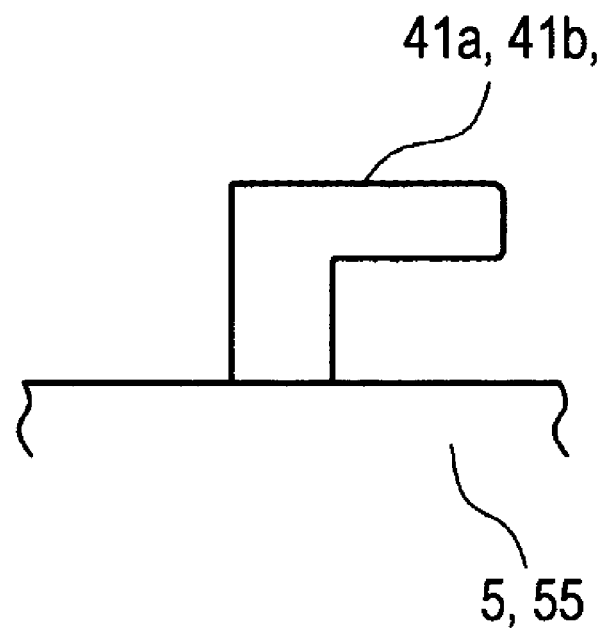

In FIG. 10B, the head of the pin 41a, 41b, 61a, 61b is in a bended shape and is formed to be in a hook shape from a lateral view. In that case, the pin 41a, 41b, 61a, 61b becomes hard to drop out of the positioning hole 41a, 61a and the hole 41b, 61b, preventing the displacement of the LED 6 caused by sliding of the board when the liquid crystal display device 1 in FIG. 1 or the liquid crystal display device 51 in FIG. 5 is given an impact.

Embodiments of Electronic Apparatus

Hereinafter, the electronic apparatus according to the invention will be explained with reference to the embodiments. However, the embodiments only show one example of the invention and thus the invention is not limited to the embodiments.

Figure 11:
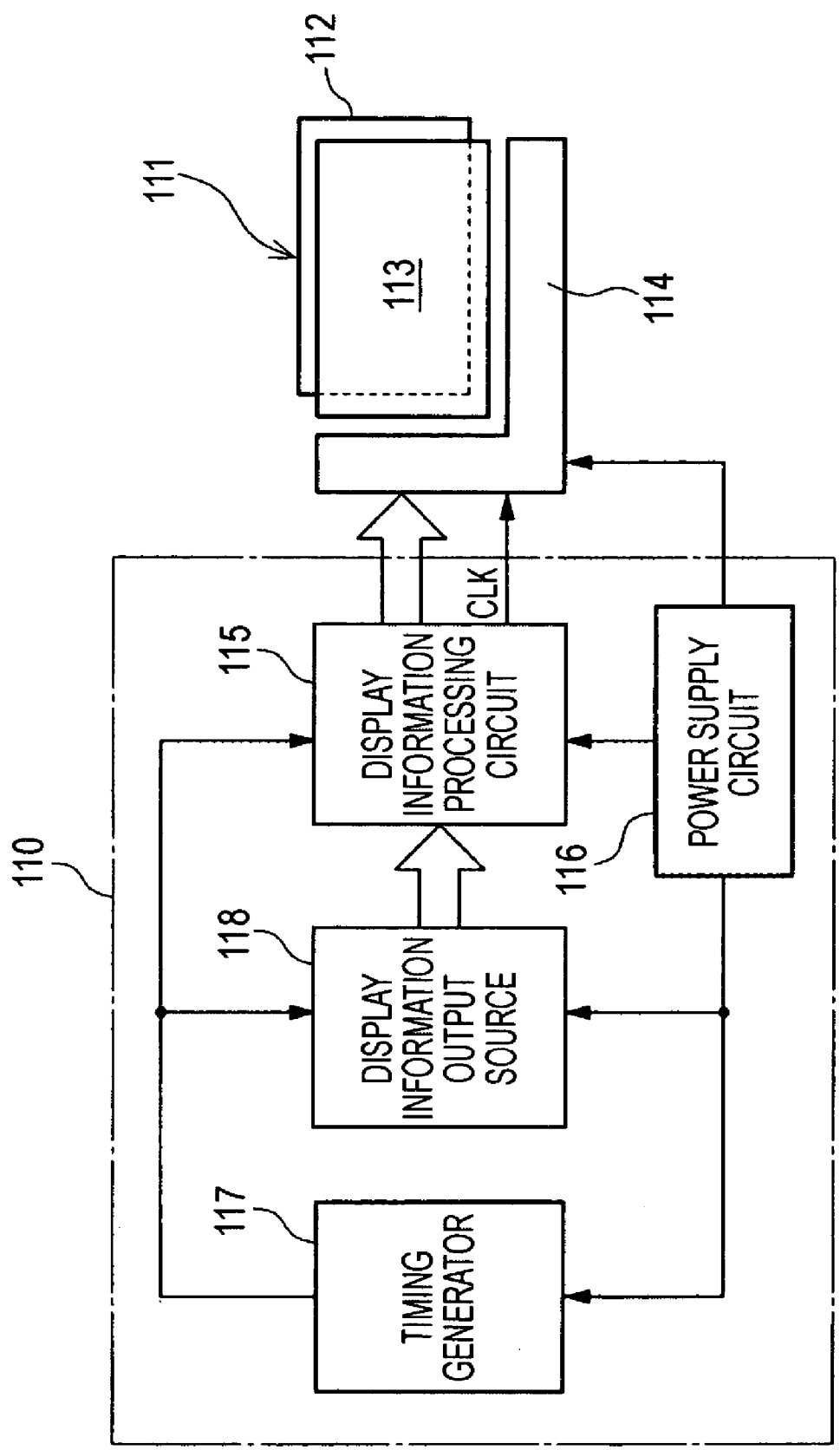
FIG. 11 is a block diagram showing an embodiment of the electronic apparatus according to the invention.

FIG. 11 shows an embodiment of the electronic apparatus according to the invention. The electronic apparatus shown herein comprises the liquid crystal display device 111 and the control circuit 110 for controlling it. The control circuit 110 is constituted by the display information processing circuit 115, the power supply circuit 116, the timing generator 117, and the display information output source 118. Then, the liquid crystal display device 111 has the liquid crystal panel 113, the lighting device 112, and the driving circuit 114.

The display information output source 118 comprises pieces of memory such as a RAM (Random Access Memory) and the like, storage units such as various types of disks and so forth, tuning circuit synchronously outputting digital image signals and so on, and provides the display information circuit 115 for the display information such as image signals with predetermined format, etc. based on a variety of clock signals generated in the timing generator 117.

Next, the display information processing circuit 115 comprises a number of known circuits such as an amplifying and inverting circuit, a rotation circuit, a gamma-correction circuit, a clamping circuit and so on, and performs processing of inputted display information and then provides the driving circuit 114 with image signals together with clock signal CLK. The driving circuit 114 herein is a generic term used to refer to a scan line driving circuit, a data line driving circuit, and further inspecting circuit, etc. Furthermore, the power supply circuit 116 provides each of the above-referenced components with predetermined power supply voltage.

The liquid crystal display device 111, for example, may be constituted using the liquid crystal display device 1 shown in FIG. 1 or the liquid crystal display device 51 shown in FIG. 5. The liquid crystal display device 1, 51 can perform the bright display without disparity since the liquid crystal display device 1, 51 uses the lighting device 2, 52 which emits the light with high brightness and without instability. Therefore, the electronic apparatus according to the invention using the liquid crystal display device 1, 51 can display information related to the electronic apparatus with stability and brightness.

Figure 12:
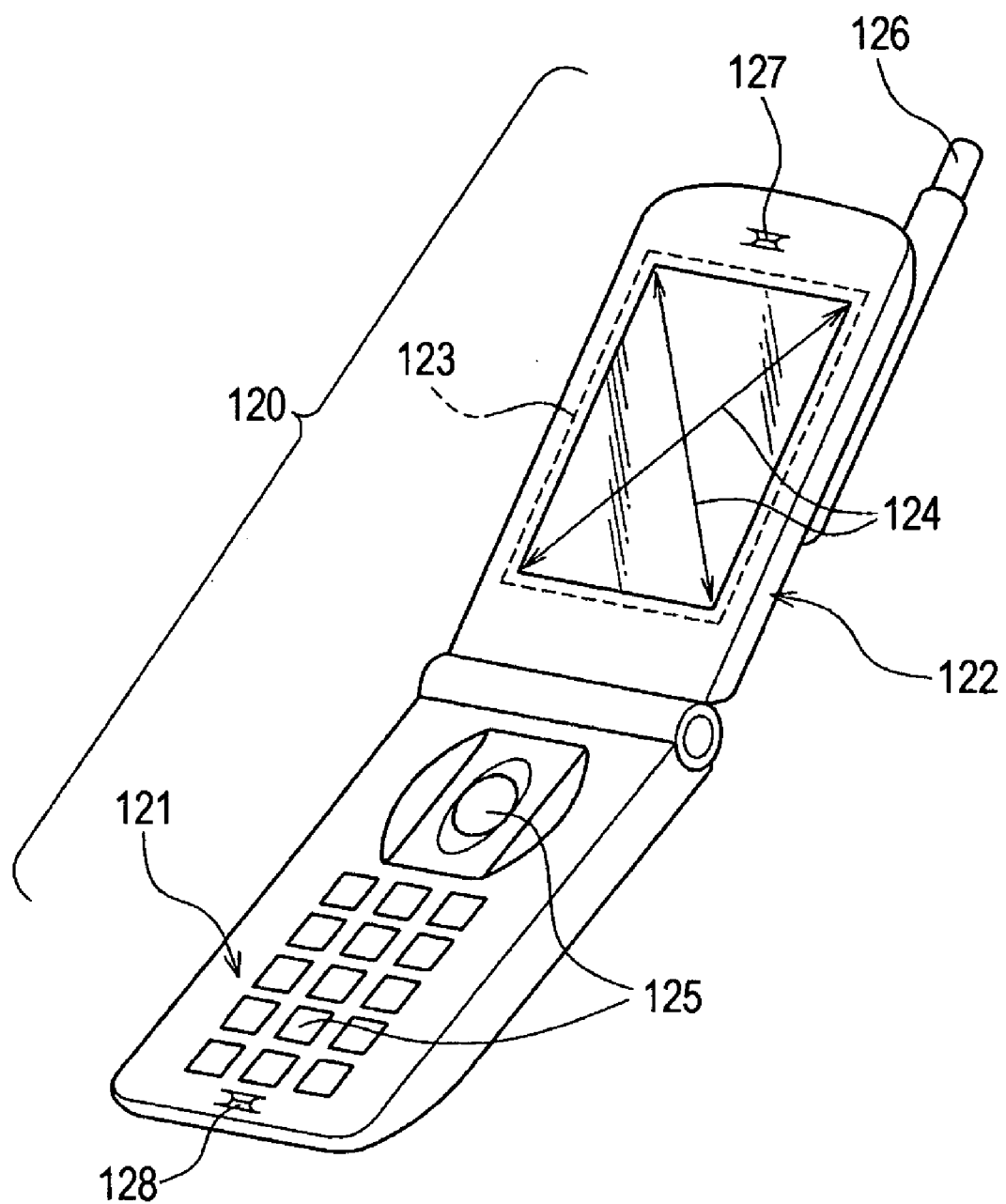
FIG. 12 is a perspective view showing another embodiment of the electronic apparatus according to the invention.

FIG. 12 shows a cellular phone which is another embodiment of the electronic apparatus according to the invention. The cellular phone 120 shown herein has the body 121 and the display part 122 provided on the body 121 to be able to open and shut. The display device 123 composed of electro-optical devices such as a liquid crystal display device and the rest is placed in the display part 122, and each indication regarding telephone communication is visible in the display screen 124 of the display part 122. Besides, the operating button 125 is arranged on the body 121.

At an edge of the display part 122, the antenna 126 is provided to be retractable. In the receiving part 127 provided in the superior part of the display part 122, a speaker, which is not illustrated, is placed. Moreover, in the transmitting part 128 provided at the bottom of the body 121, a microphone, which is not illustrated as well, is embedded. The control unit for controlling the operation of the display device 123 is contained as a part of the control unit generally controlling the cellular phone, otherwise in the body 121 or the display part 122 separately from the control unit.

The display device 123 may be constituted, for example, using the liquid crystal display device 1 shown in FIG. 1 or the liquid crystal display device 51 shown in FIG. 5. The liquid crystal display device 1, 51 can perform the bright display without disparity due to the use of the lighting device 2, 52 emitting light with high brightness and no disparity. Therefore, the cellular-phone 120 according to the invention using the liquid crystal display device 1, 51 can display information related to the cellular phone 120 with stability and brightness.

Modified Example

Besides the above-referenced cellular phone and so on, personal computers, liquid crystal televisions, viewfinder or monitor type of video tape recorders, car navigation devices, pagers, personal digital assistances, calculators, word processors, workstations, videophones, and point-of-sale terminals and the rest may be quoted as the electronic apparatus.

What is claimed is:

1. A lighting device, comprising:
 a board defining a first hole having a periphery, the periphery further defining a projecting part extending from the periphery;
 a light source mounted on the board;
 a light guide including a light receiving plane that receives light emitted from the light source and a light transmitting plane that transmits the light; and
 a first protrusion formed integrally with the light guide, the first protrusion being inserted into the first hole, the projecting part pressing against a side surface of the first protrusion so as to move the board toward the light receiving plane.

2. The lighting device according to claim 1, wherein
 the light source includes a emitting plane which emits the light; and
 the projecting part presses the side of the first protrusion so that the emitting plane contacts the light receiving plane.

3. The light apparatus according claim 1, further comprising a plurality of first holes, the first holes being aligned in a direction parallel with the light receiving plane.

4. The lighting device according to claim 3, wherein
 the first protrusion and at least one of the plurality of first holes positions the light source in a direction parallel with the light receiving plane.

5. The lighting device according to claim 1, further comprising:
 a second protrusion which is integrally formed in the light guide; and
 a hole for positioning which is provided in the board and is connected with the second protrusion,
 wherein,
 the hole for positioning is connected with the second protrusion so that the movement of the board is restrained in a parallel direction with the light receiving plane of the light guide.

6. The lighting device according to claim 4, wherein
 the first hole is larger than the outside size of the first protrusion in a direction parallel with the light receiving plane by a size that enables the first protrusion to pass into the first hole.

7. The lighting device according to claim 6, wherein
 the first hole has any one of oval, ellipse, or rectangle shapes.

8. The lighting device according to claim 1, wherein
 the projecting part is formed in the center of the first hole, in a side of the first hole, or in both sides of the first hole.

9. An electro-optical device, comprising:
 a board defining a first hole having a periphery, the periphery defining a projecting part extending from the periphery;
 a light source mounted on the board;

a light guide including a light receiving plane that receives light emitted from the light source and a light transmitting plane that transmits the light; and a first protrusion formed integrally with the light guide, the first protrusion being inserted into the first hole, the projecting part pressing against a side surface of the first protrusion so as to move the board toward the light receiving plane.

10. The lighting device according to claim 9, wherein the board mounting the light source is connected to the electro-optical panel and has a flexibility to bend toward a plane opposite to the light transmitting plane of the light guide.

11. An electronic apparatus, comprising:
the electro-optical device according to claim to 9.

* * * * *